(12) United States Patent
Montanari

(10) Patent No.: US 10,302,518 B2
(45) Date of Patent: May 28, 2019

(54) WHEEL BALANCING DEVICE

(71) Applicant: Beissbarth GmbH, Munich (DE)

(72) Inventor: Marco Montanari, Correggio (IT)

(73) Assignee: Beissbarth GmbH, Munich (DE)

( * ) Notice: Subject to any disclaimer, the term of this patent is extended or adjusted under 35 U.S.C. 154(b) by 0 days.

(21) Appl. No.: 15/736,099

(22) PCT Filed: Jun. 3, 2016

(86) PCT No.: PCT/EP2016/062681
§ 371 (c)(1),
(2) Date: Dec. 13, 2017

(87) PCT Pub. No.: WO2017/001148
PCT Pub. Date: Jan. 5, 2017

(65) Prior Publication Data
US 2018/0180507 A1      Jun. 28, 2018

(30) Foreign Application Priority Data
Jun. 30, 2015 (EP) ..................................... 15174436

(51) Int. Cl.
*G01M 1/02* (2006.01)
*G01M 1/16* (2006.01)
*G01M 1/22* (2006.01)
*G01M 1/32* (2006.01)

(52) U.S. Cl.
CPC ................ *G01M 1/02* (2013.01); *G01M 1/16* (2013.01); *G01M 1/225* (2013.01); *G01M 1/326* (2013.01)

(58) Field of Classification Search
CPC .......... G01M 1/02; G01M 1/16; G01M 1/225; G01M 1/326
See application file for complete search history.

(56) References Cited

U.S. PATENT DOCUMENTS

| | | | |
|---|---|---|---|
| 5,189,912 A | 3/1993 | Quinlan et al. | |
| 5,979,237 A * | 11/1999 | Spaggiari ................ | G01M 1/32 73/462 |
| 6,484,574 B1 * | 11/2002 | Douglas .................. | G01M 1/02 73/462 |
| 7,221,441 B2 * | 5/2007 | Douglas .................. | G01M 1/26 356/139.09 |
| 7,686,403 B2 * | 3/2010 | Douglas .................. | G01M 1/16 301/5.21 |

(Continued)

FOREIGN PATENT DOCUMENTS

| | | |
|---|---|---|
| EP | 724144 A1 | 7/1996 |
| EP | 1512953 A1 | 3/2005 |

OTHER PUBLICATIONS

International Search Report dated Sep. 6, 2016, of the corresponding International Application PCT/EP2016/062681 filed Jun. 3, 2016.

(Continued)

*Primary Examiner* — Francis C Gray
(74) *Attorney, Agent, or Firm* — Norton Rose Fulbright US LLP; Gerard A. Messina

(57) ABSTRACT

A wheel balancing device for balancing spoked wheels, includes a rotatable holding device that is configured to receive and rotatably support a spoked wheel to be balanced, as well as at least one spoke sensor that is configured to detect the spokes of the wheel.

8 Claims, 1 Drawing Sheet

(56) References Cited

U.S. PATENT DOCUMENTS

| 8,113,049 B2* | 2/2012 | Corghi | G01B 11/2522 |
| | | | 353/13 |
| 2002/0189336 A1 | 12/2002 | Mcewan | |
| 2005/0052658 A1* | 3/2005 | Braghiroli | G01M 1/02 |
| | | | 356/602 |
| 2008/0060425 A1* | 3/2008 | Douglas | G01M 1/16 |
| | | | 73/66 |

OTHER PUBLICATIONS

European Office Action dated Nov. 28, 2018, issued in European Application No. 15 174 436.4-1001, filing date Jun. 30, 2015.

* cited by examiner

WHEEL BALANCING DEVICE

FIELD

The present invention relates to a wheel balancing device, in particular, a wheel balancing device for balancing spoked wheels.

BACKGROUND INFORMATION

Wheel balancing devices are used for determining the positions and sizes of balancing weights, which are to be attached to a wheel in order to correct imbalances.

If the wheel to be balanced is a spoked wheel, it is desirable to attach the balancing weights at the positions of the spokes, in particular, behind the spokes of the wheel, in the circumferential direction of the wheel. To that end, the positions of the spokes must be known to the wheel balancing device. In order to make the positions of the spokes known to the wheel balancing device, the number of spokes is inputted manually into the wheel balancing device, and the wheel is rotated manually in such a manner, that the spokes of the wheel are situated in order at a predefined reference position. This operation is time-consuming and laborious.

A wheel balancing device of the present invention, which is intended, in particular, for balancing spoked wheels, includes a rotatable holding device that is configured to receive and rotatably support a wheel to be balanced, as well as at least one spoke sensor that is configured to detect the spokes of the wheel, in particular, their number and/or their positions.

A method of the present invention for determining the number and/or the positions of the spokes of a spoked wheel in a wheel balancing device includes the steps:

a) rotating the spoked wheel about its axis; and b) detecting the spokes of the wheel, using a spoke sensor, while the wheel is rotated.

The present invention allows the number and the position of the spokes of a spoked wheel to be determined prior to and/or during the balancing operation in a rapid and convenient manner. The previously necessary positioning of the spokes at a predefined reference position by rotation of the wheel may be eliminated. As a result, the balancing of spoked wheels is markedly simplified and expedited.

The spoke sensor may be, in particular, a contactless sensor that is configured to detect the spokes in a non-contact manner. In this manner, damage to and/or aesthetic deterioration of the spokes by the sensor, as may occur in the case of a mechanical spoke sensor, are reliably prevented.

The spoke sensor may be an acoustic sensor, in particular, an ultrasonic sensor, or an optical sensor, in particular, a light reflection sensor. An optical sensor, which may take the form of, in particular, an infrared and/or laser sensor, also allows the spokes to be detected reliably at high rotational speeds.

In one specific embodiment, the wheel balancing device includes, in addition to the spoke sensor, an angular position sensor and an evaluation unit. The angular position sensor is configured to measure the current angular position of the wheel, and the evaluation unit is configured to determine the (angular) positions of the spokes along the circumference of the wheel. In this manner, the (angular) positions of the spokes in the circumferential direction of the wheel may be clearly determined. Through this, while determining the positions of the balancing weights, the (angular) positions of the spokes may be taken into account in such a manner, that the balancing weights are attached exclusively behind the spokes of the wheel, where they are not visible from the outside and are protected from external mechanical effects.

The evaluation unit may be configured to determine the positions of the spokes, while the wheel rotates about its axis, e.g., during the balancing operation, at a constant rotational speed, in particular, the balancing speed.

Alternatively, the evaluation unit may be configured to determine the positions of the spokes while the wheel is accelerated to the balancing speed or decelerated from the balancing speed.

Finally, the evaluation unit may be configured to determine the positions of the spokes while the wheel is rotated at a low speed, in particular, by hand, about its axis. A low rotational speed is particularly advantageous, when a sensor having a low rate of response, e.g., an acoustic sensor, is used as a spoke sensor.

BRIEF DESCRIPTION OF THE DRAWINGS

In the following, the present invention is explained in greater detail with reference to the figures.

DETAILED DESCRIPTION OF EXAMPLE EMBODIMENTS

Figure 1:
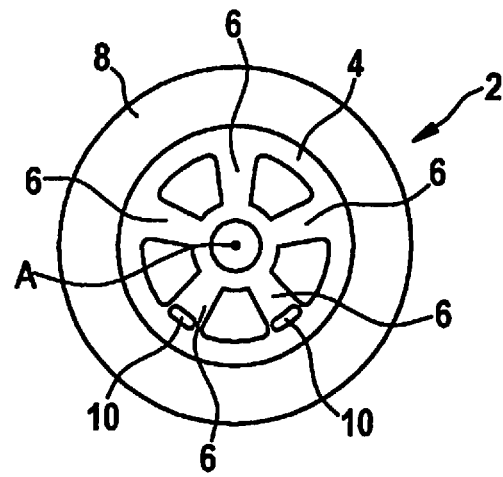
FIG. 1 shows a schematic view of a spoked wheel.

FIG. 1 shows a schematic view of a spoked wheel 2 axially symmetric about an axis A; the spoked wheel including a rim 4, which has a number of spokes 6, five in the embodiment shown, as well as a tire 8 fitted onto rim 4.

Balancing weights 10, which are attached to rim 4 to balance spoked wheel 2, are preferably attached behind spokes 6 of rim 4, in order that they are not visible from the outside and are protected from external mechanical effects. To that end, the positions of spokes 6 must be known to the wheel balancing device.

Figure 2:
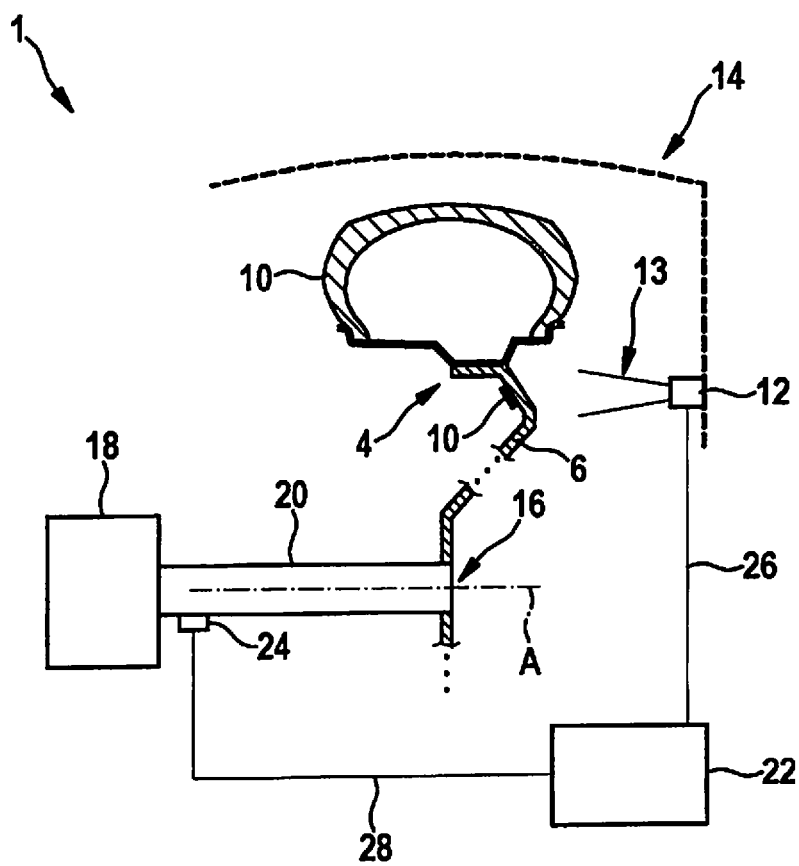
FIG. 2 shows a schematic sectional view of an exemplary embodiment of a wheel balancing device according to the present invention.

FIG. 2 shows a schematic view of an exemplary embodiment of a wheel balancing device 1 according to the present invention.

Wheel balancing device 1 includes a rotatable shaft 20, which, in the representation of FIG. 2, runs in a horizontal direction from left to right; the shaft having a holding device (hub) 16, which is shown only schematically in FIG. 2, and to which spoked wheel 2 is mountable in such a manner, that it may be rotated by a motor 18, or manually, about the axis of shaft 20, which coincides with axis A of the wheel 2 mounted to holding device 16.

In addition, wheel balancing device 1 includes at least one spoke sensor 12, which is configured to detect if a spoke 6 of wheel 2 is situated in sensing region 13 of spoke sensor 12.

In the exemplary embodiment shown in FIG. 2, spoke sensor 12 is attached to a movable, in particular, swiveling covering device 14 of wheel balancing device 1. Covering device 14 is provided, in order to protect the operator of wheel balancing device 1 from coming into contact with rotating wheel 2. To that end, covering device 14 is preferably configured in such a manner, that motor 18 may only be operated when covering device 14 is closed and covering device 14 may only be opened when wheel 2 has stopped.

Alternatively, spoke sensor 12 may also be attached to a different point of wheel balancing device 1, which is stationary during operation and, in particular, does not rotate together with wheel 2.

In particular, spoke sensor 12 may take the form of a contactless sensor, which is able to detect spokes 6 without contact. Contactless detection of spokes 6 may allow reliable prevention of damage to and/or aesthetic deterioration, e.g., scratches, of spokes 6 by spoke sensor 12, as may occur in the case of a mechanical spoke sensor 12.

Contactless spoke sensor 12 may be, e.g., an acoustic sensor, in particular, an ultrasonic sensor, or an optical sensor, in particular, a light reflection sensor.

The optical sensor may operate, using light in the visible range and/or light in the invisible range. An optical sensor, which may take the form of, in particular, an infrared and/or laser sensor, also allows spokes 6 to be detected reliably at high rotational speeds of spoked wheel 2.

Spoke sensor 12 is connected to an evaluation unit 22 via a wireless and/or cable connection 26, in order to transmit the measuring signals generated by it to evaluation unit 22. Evaluation unit 22 is also connected to an angular position sensor 24 via a further wireless and/or cable connection 28; the angular position sensor being attached to rotatable shaft 20, in order to determine the current angular position of shaft 20 and, therefore, also the angular position of wheel 2 during rotation about axis A. By combining the signals supplied by angular position sensor 18 and by spoke sensor 12, the angular positions of spokes 6 along the circumference of rim 4 may be clearly determined.

If the angular positions of spokes 6 in the direction of the circumference of rim 4 are known, the positions to which balancing weights 8 are to be attached may be determined in such a manner, that balancing weights 8 are attached exclusively at the angular positions of spokes 6, in particular, behind the spokes 6 of rim 4, where they are not visible from the outside. In this manner, aesthetic deterioration of wheel 2 by the balancing weights may be prevented, and balancing weights 10 are protected from external mechanical effects by spokes 6.

What is claimed is:

1. A wheel balancing device for balancing spoked wheels, comprising:
    a rotatable holding device configured to receive and rotatably support a spoked wheel to be balanced;
    at least one spoke sensor configured to detect the spokes of the wheel;
    an angular position sensor configured to detect a current angular position of the wheel; and
    an evaluation unit configured to determine positions of the spokes along a circumference of the wheel, wherein the evaluation unit is configured to determine the positions of the spokes while the spoked wheel is accelerated or decelerated.

2. The wheel balancing device as recited in claim 1, wherein the spoke sensor is configured to detect at least one of the number of the spokes and a position of the spokes.

3. The wheel balancing device as recited in claim 1, wherein the spoke sensor is configured to detect the spokes in a contactless manner.

4. A wheel balancing device for balancing spoked wheels, comprising:
    a rotatable holding device configured to receive and rotatably support a spoked wheel to be balanced; and
    at least one spoke sensor configured to detect the spokes of the wheel, wherein the spoke sensor is configured to detect the spokes in a contactless manner, and wherein the spoke sensor is an ultrasonic sensor.

5. The wheel balancing device as recited in claim 3, wherein the spoke sensor is a light reflection sensor.

6. The wheel balancing device as recited in claim 1, wherein the evaluation unit is configured to determine positions of the spokes while the spoked wheel rotates at a constant speed.

7. A method for determining the number and/or positions of spokes of a spoked wheel in a wheel balancing device, the method comprising:
    a) rotating the spoked wheel about its axis;
    b) detecting the spokes of the spoked wheel, using a contactless spoke sensor, while the spoked wheel is rotating;
    c) detecting a current angular position of the wheel; and
    d) determining positions of the spokes along a circumference of the wheel, wherein the determining is performed while the spoked wheel is accelerated or decelerated.

8. The method as recited in claim 7, wherein rotating the spoked wheel in step a) includes rotating the spoked wheel manually or in motor-driven fashion.

\* \* \* \* \*